United States Patent
Pang et al.

(10) Patent No.: US 11,252,381 B2
(45) Date of Patent: Feb. 15, 2022

(54) IMAGE SENSOR WITH SHARED MICROLENS

(71) Applicant: OmniVision Technologies, Inc., Santa Clara, CA (US)

(72) Inventors: Chin Poh Pang, Pleasanton, CA (US); Guansong Liu, San Jose, CA (US); Xiaodong Yang, San Jose, CA (US); Boyang Zhang, San Jose, CA (US); Hongjun Li, San Jose, CA (US); Da Meng, Fremont, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 132 days.

(21) Appl. No.: 16/711,237

(22) Filed: Dec. 11, 2019

(65) Prior Publication Data

US 2021/0185286 A1 Jun. 17, 2021

(51) Int. Cl.
*H04N 5/335* (2011.01)
*H04N 9/04* (2006.01)
*H04N 5/378* (2011.01)

(52) U.S. Cl.
CPC ......... *H04N 9/04559* (2018.08); *H04N 5/378* (2013.01)

(58) Field of Classification Search
CPC .... H04N 9/04559; H04N 9/045; H04N 5/378; H04N 5/3745; H04N 5/23212; H04N 5/232122; H01L 27/14627; H01L 27/14621; H01L 27/14645; H01L 27/14643; G06T 3/4015
See application file for complete search history.

(56) References Cited

U.S. PATENT DOCUMENTS

| | | | |
|---|---|---|---|
| 5,890,095 | A | 3/1999 | Barbour et al. |
| 7,002,627 | B1 | 2/2006 | Raffy et al. |
| 8,530,266 | B1 | 9/2013 | Chen et al. |
| 9,443,899 | B1 | 9/2016 | Liu et al. |
| 9,807,294 | B2 | 10/2017 | Liu et al. |
| 10,015,389 | B2 | 7/2018 | Lu et al. |
| 10,260,866 | B2 | 4/2019 | Kadambi et al. |

(Continued)

OTHER PUBLICATIONS

Jang, J., et al., "Sensor-Based Auto-Focusing System Using Multi-Scale Feature Extraction and Phase Correlation Matching," Sensors, 2015, vol. 15, pp. 5747-5762.

(Continued)

*Primary Examiner* — Kelly L Jerabek
(74) *Attorney, Agent, or Firm* — Christensen O'Connor Johnson Kindness PLLC

(57) ABSTRACT

An image sensor includes a plurality of photodiodes, a plurality of color filters, and a plurality of microlenses. The plurality of photodiodes are arranged as a photodiode array, each of the plurality of photodiodes disposed within respective portions of a semiconductor material with a first lateral area. The plurality of color filters are arranged as a color filter array optically aligned with the photodiode array. Each of the plurality of color filters having a second lateral area greater than the first lateral area. The plurality of microlenses are arranged as a microlens array optically aligned with the color filter array and the photodiode array. Each of the plurality of microlenses have a third later area greater than the first lateral area and less than the second lateral area.

16 Claims, 6 Drawing Sheets

(56) References Cited

U.S. PATENT DOCUMENTS

| | | | |
|---|---|---|---|
| 2007/0014019 A1* | 1/2007 | Mouli | H04N 9/04557 |
| | | | 359/619 |
| 2011/0019041 A1* | 1/2011 | Ishiwata | H04N 5/374 |
| | | | 348/280 |
| 2015/0358597 A1 | 12/2015 | Pang et al. | |
| 2016/0150199 A1 | 5/2016 | Wu et al. | |
| 2017/0272642 A1* | 9/2017 | Zhang | H04N 5/2257 |
| 2019/0096945 A1 | 3/2019 | Lu et al. | |
| 2020/0280704 A1* | 9/2020 | Galor Gluskin | G06T 5/009 |
| 2021/0067703 A1* | 3/2021 | Kadambala | H04N 9/04515 |

OTHER PUBLICATIONS

Kadambi, A., et al., "Polarized 3D: High-Quality Depth Sensing with Polarization Cues," ICCV, 2015, 9 pages.

Yuffa, A.J., et al., "Three-dimensional facial recognition using passive long-wavelength infrared polarimetric imaging," Applied Optics, vol. 53, No. 36, Dec. 2014, 9 pages.

* cited by examiner

500

550

IMAGE SENSOR WITH SHARED MICROLENS

TECHNICAL FIELD

This disclosure relates generally to image sensors, and in particular but not exclusively, relates CMOS image sensors and applications thereof.

BACKGROUND INFORMATION

Image sensors have become ubiquitous and are now widely used in digital cameras, cellular phones, security cameras, as well as, medical, automobile, and other applications. As image sensors are integrated into a broader range of electronic devices it is desirable to enhance their functionality, performance metrics, and the like in as many ways as possible (e.g., resolution, power consumption, dynamic range, etc.) through both device architecture design as well as image acquisition processing.

The typical image sensor operates in response to image light reflected from an external scene being incident upon the image sensor. The image sensor includes an array of pixels having photosensitive elements (e.g., photodiodes) that absorb a portion of the incident image light and generate image charge upon absorption of the image light. The image charge of each of the pixels may be measured as an output voltage of each photosensitive element that varies as a function of the incident image light. In other words, the amount of image charge generated is proportional to the intensity of the image light, which is utilized to produce a digital image (i.e., image data) representing the external scene.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1A:
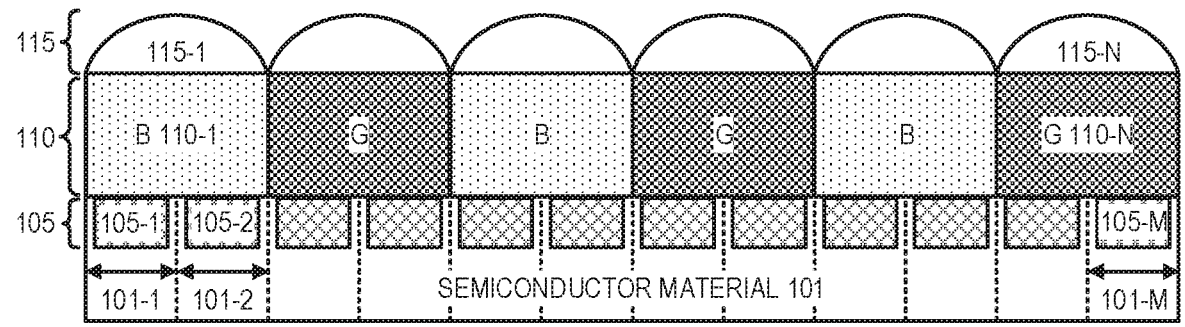
FIG. 1A illustrates a cross-sectional view of an image sensor with shared microlenses, in accordance with the teachings of the present disclosure.

Embodiments of an apparatus, system, and method each including or otherwise related to an image sensor with a shared microlens are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Embodiments described herein utilize an image sensor with a shared microlens architecture to provide a single sensor solution to enable multi-directional phase detection auto focus (PDAF) for every pixel included in the image sensor, whole array depth mapping, and high dynamic range (HDR) image capture. In some embodiments, each full color pixel of the image sensor may include a plurality of subpixels (e.g., groups of photodiodes optically aligned with a common color filter and microlens) that may each be configured as phase detectors to determine whether a point of interest (POI) within the image frame is in focus and may provide multi-directional guidance as to how an objective lens of an imaging system should be adjusted when the POI is out of focus. In the same or other embodiments, relative depth information may be provided by each of the plurality of subpixels and/or full color pixels to generate a depth map of an external scene. In some embodiments, the photodiodes within the plurality of subpixels may not have identical integration times during image capture such that dynamic range of the image sensor may be increased.

FIGS. 1A-1D illustrate representative views of an image sensor 100 including a semiconductor material 101, a plurality of photodiodes 105, a plurality of color filters 110, and a plurality of microlenses 115. It is appreciated that the views presented in FIGS. 1A-1D may omit certain elements of image sensor 100 to avoid obscuring details of the disclosure. It is further appreciated that in some embodiments, image sensor 100 may not necessarily include all elements illustrated in FIGS. 1A-1D.

FIG. 1A illustrates a cross-sectional view 100-A of image sensor 100 with shared microlenses, in accordance with the teachings of the present disclosure. More specifically, cross-sectional view 100-A is a representative view taken along a row or column of image sensor 100 (e.g., column "C1" illustrated in FIG. 1B). Referring back to FIG. 1A, image sensor 100 includes plurality of photodiodes 105 arranged as a photodiode array containing M individual photodiodes (e.g., 105-1, 105-2, . . . , 105-M), each of the plurality of photodiodes 105 disposed within respective portions of semiconductor material 101 (e.g., silicon). In other words, there is a 1-to-1 ratio between the number of respective portions of semiconductor material 101 and the number of individual photodiodes 105. In some embodiments individual photodiodes included in the plurality of photodiodes 105 may correspond to doped regions within the respective portions of semiconductor material 101 that are collectively responsive to incident light (e.g., the doped regions may form a PN junction that generates electrical or image charge proportional to a magnitude or intensity of the incident light). In the illustrated embodiment, each of the respective portions of semiconductor material 101 (e.g., 101-1, 101-2, . . . , 101-M) include a respective one of the plurality of photodiodes 105 such that the respective portions of semiconductor material 101 each have a first lateral area that is greater than the lateral area of a corresponding one of the individual photodiodes included in the plurality of photodiodes 105. For example, photodiode 105-1 is formed within respective portion 101-1 of semiconductor material 101, but notably does not laterally extend across the entirety of the respective portion 101-1. Thus, it is appreciated that individual photodiodes included in the plurality of photodiodes 105 do not necessarily extend laterally across the entire cross-sectional area of the respective portions of semiconductor material 101. Rather, portions of semiconductor material 101 disposed between adjacent photodiodes (e.g., region of semiconductor material 101 between photodiodes 105-1 and 105-2) may be utilized to form additional structures within the semiconductor material (e.g., isolation trenches, floating diffusion, and the like). In other embodiments, the respective portions of the semiconductor material 101 and the associated first lateral area corresponds to a largest lateral area of individual photodiodes included in the plurality of photodiodes 105. In other words, in some embodiments the first lateral area corresponds to an area of an individual photodiode included in the plurality of photodiodes 105.

In the illustrated embodiment, image sensor 100 further includes plurality of color filters 110 arranged as a color filter array optically aligned with the photodiode array formed by plurality of photodiodes 105. The plurality of color filters 110 may include N color filters (e.g., 110-1, . . . 110-N) that each have a specific spectral photoresponse to filter incident light propagating through an individual one of the plurality of color filters to a group of the plurality of photodiodes 105. For example, blue color filter 110-1 is optically aligned with at least two photodiodes, 105-1 and 105-2, such that the image charge generated in response to incident light by photodiodes 105-1 and 105-2 is substantially proportional to the intensity or magnitude of the blue component within the spectrum of light incident upon photodiodes 105-1 and 105-2. It is appreciated that plurality of color filters 110 is not limited to a single spectral photoresponse and that other types of color filters may be included in image sensor 100 with corresponding spectral photoresponse substantially equivalent to any one of, or a combination of, red, green, blue, panchromatic (i.e., clear or white), yellow, cyan, magenta, or other colors. In some embodiments, the color filter array may consequently be utilized to generate image signals representative of the incident light within at least the visible spectrum to generate an image representative of an external scene. In the illustrated embodiment, individual color filters included in plurality of color filters 110 are optically aligned with groups of at least two photodiodes included in plurality of photodiodes 105 such that individual color filters (e.g., 110-1, . . . , 110-N) each have a second lateral area greater than the first lateral area of a corresponding optically aligned photodiode (e.g., 105-1, 105-2, . . . 105-M).

As illustrated in FIG. 1A, image sensor 100 includes plurality of microlenses 115 arranged as a microlens array optically aligned with the color filter array (e.g., formed by plurality of color filters 110) and the photodiode array (e.g., formed by plurality of photodiodes 105). Each of the microlenses may be formed of a polymer (e.g., polymethylmethacrylate, polydimethylsiloxane, etc.) or other material and be shaped to have optical power for converging, diverging, or otherwise directing light incident upon the plurality of microlenses 115 (e.g., 115-1) through a corresponding optically aligned one (e.g., 110-1) of the plurality of color filters 110 to a respective group (e.g., at least 105-1 and 105-2) of photodiodes included in the plurality of photodiodes 105. In some embodiments there is a 1-to-1 ratio between the number of color filters included in the plurality of color filters 110 and the number of microlenses included in the plurality of microlenses 115, which may be less than the number of photodiodes included in the plurality of photodiodes 105. In one embodiment, the ratio of photodiodes to microlenses and/or color filters may be 2-to-1, 3-to-1, 4-to-1, or otherwise. Accordingly, individual microlenses (e.g., 115-1, . . . , 115-N) included in the plurality of microlenses 115 have a third lateral area that is greater than the first lateral area of individual photodiodes included in the plurality of photodiodes 105, but the third lateral area is less than the second lateral area of the color filters included in the plurality of color filters 110.

It is appreciated that image sensor 100 may be fabricated by semiconductor device processing and microfabrication techniques known by one of ordinary skill in the art. In one embodiment, fabrication of image sensor 100 may include providing a semiconductor material (e.g., a silicon wafer having a front side and a back side), forming a mask or template (e.g., out of cured photo resist) on the front side of the semiconductor material 101 via photolithography to provide a plurality of exposed regions of the front side of semiconductor material 101, doping (e.g., via ion implantation, chemical vapor deposition, physical vapor deposition, and the like) the exposed portions of the semiconductor material 101 to form the plurality of photodiodes 105 that extend into semiconductor material 101 from the front side of semiconductor material 101, removing the mask or template (e.g., by dissolving the cured photoresist with a solvent), and planarizing (e.g., via chemical mechanical planarization or polishing) the front side of semiconductor material 101. In the same or another embodiment, photolithography may be similarly used to form the plurality of color filters 110 (e.g., cured pigmented polymers having a desired spectral photoresponse) and the plurality of microlenses 115 (e.g., polymer based microlenses having a target shape and size formed from a master mold or template). It is appreciated that the described techniques are merely demonstrative and not exhaustive and that other techniques may be utilized to fabricate one or more components of image sensor 100.

Figure 1B:
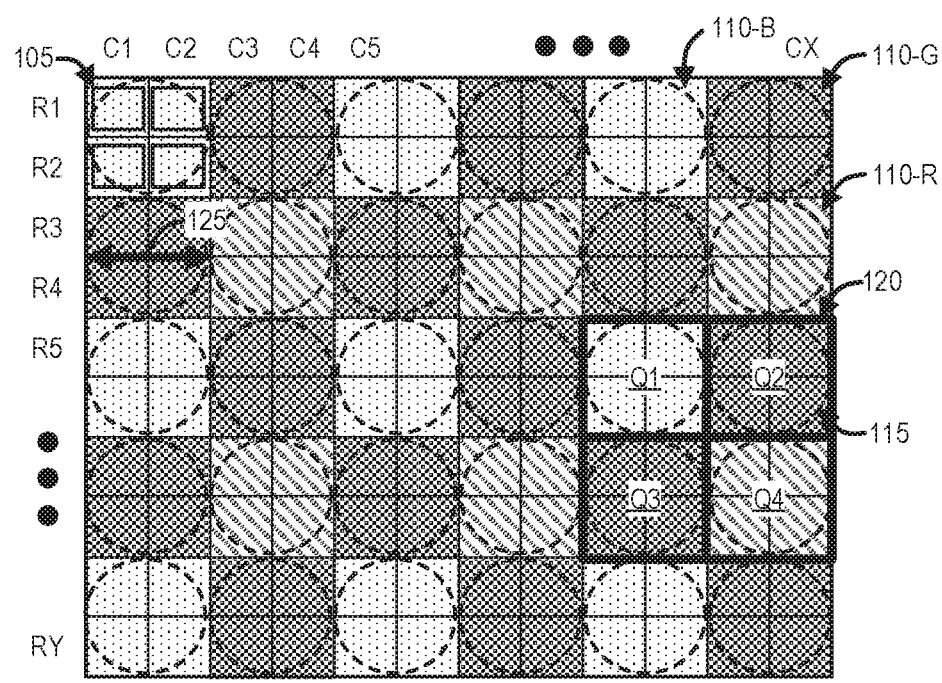
FIG. 1B illustrates a top view of an image sensor with shared microlenses, in accordance with the teachings of the present disclosure.

FIG. 1B illustrates a top view 100-B of image sensor 100 with shared microlenses, in accordance with the teachings of the present disclosure. As illustrated, image sensor 100 may be addressed or otherwise described as an array including a plurality of rows (e.g., R1, R2, R3, . . . , RY) and columns (e.g., C1, C2, C3, . . . , CX). Each element of the array with Y rows and X columns may include a respective photodiode included in the plurality of photodiodes 105, color filter included in the plurality of color filters 110, and microlens included in the plurality of microlenses 115. For example, the array element associated with row 1 column 1 of the image sensor 100 illustrated in FIG. 1B may be representative of a top-down view illustrated in FIG. 1A extending from microlens 115-1 and through color filter 110-1, photodiode 105-1, and respective portion of semiconductor material 101-1. Referring back to FIG. 1B, it is appreciated that certain elements may be omitted or unlabeled (e.g., plurality of photodiodes 105, plurality of color filters 110, respective portions of semiconductor material 101, and the like illustrated in FIG. 1A) to avoid obscuring certain aspects of the disclosure.

In the illustrated embodiment of FIG. 1B, the plurality of color filters 110 form a color filter array including blue color filters 110-B, green color filters 110-G, and red color filters 110-R arranged in a pre-determined pattern. The pre-determined pattern of the color filter array includes a plurality of tiled minimal repeating units (e.g., repeat unit 120) corresponding to groups of four abutting color filters included in the plurality of color filters 110. The groups of four abutting color filters include a first color filter with a first spectral photoresponse, a second color filter with a second spectral photoresponse, a third color filter with a third spectral photoresponse, and a fourth color filter with a fourth spectral photoresponse. In some embodiments, the second spectral photoresponse is substantially identical to the third spectral photoresponse. In the same or another embodiment the first spectral photoresponse and the fourth spectral photoresponse are different from each other, the second spectral photoresponse, and the third spectral photoresponse. In some embodiments the second color filter and the third color filter are substantially identical in terms of spectral photoresponse and are disposed diagonally opposite one another within an individual one of the plurality of tiled minimal repeating units.

As illustrated in FIG. 1B, each of the plurality of tiled minimal repeating units are representative of a full color pixel (i.e., image pixel) of image sensor 100 with a predetermined arrangement of different color filters such that image signals (e.g., electrical signals having a magnitude proportional to intensity of incident light) generated by the underlying photodiodes are collectively representative of the visible spectrum of electromagnetic radiation. As illustrated, repeat unit 120 includes four quadrants (e.g., Q1 with a blue color filter, Q2 with a first green color filter, Q3 with a second green color filter, and Q4 with a red color filter). Each quadrant corresponds to a subpixel and collectively repeat unit 120 forms an image pixel of image sensor 100. Additionally, each quadrant of the minimal repeating unit (e.g., repeat unit 120) includes a group of four photodiodes arranged in a 2-by-2 pattern or array (e.g., as illustrated in the top left of FIG. 1B) that share (i.e., are optically aligned with) a common color filter and a common microlens. More specifically, in the illustrated embodiment, each of the plurality of color filters 110 extend across individual groups of four adjacent photodiodes 105 within a corresponding quadrant of a respective one of the minimally repeating units. In some embodiments each of the plurality of microlenses 110 is symmetric and optically centered over a corresponding 2-by-2 array of photodiodes and color filter included in a corresponding pixel or subpixel of image sensor 100. For example, diameter 125 of the corresponding microlens illustrated in FIG. 1B substantially extends across two columns of image sensor 100. It is appreciated that that due to spacing between individual microlenses (i.e., in embodiments where the individual microlenses do not contact one another) the diameter of a microlens may not necessarily span exactly two columns or rows of image sensor 100. Rather, the diameter of an individual microlens may be greater than one row or column of image sensor 100, but less than or equal to two columns or rows. It is further appreciated that in some embodiments, some or all of the plurality of microlenses 110 may not necessarily be symmetric (i.e., the microlenses may be asymmetric).

Figure 1C:
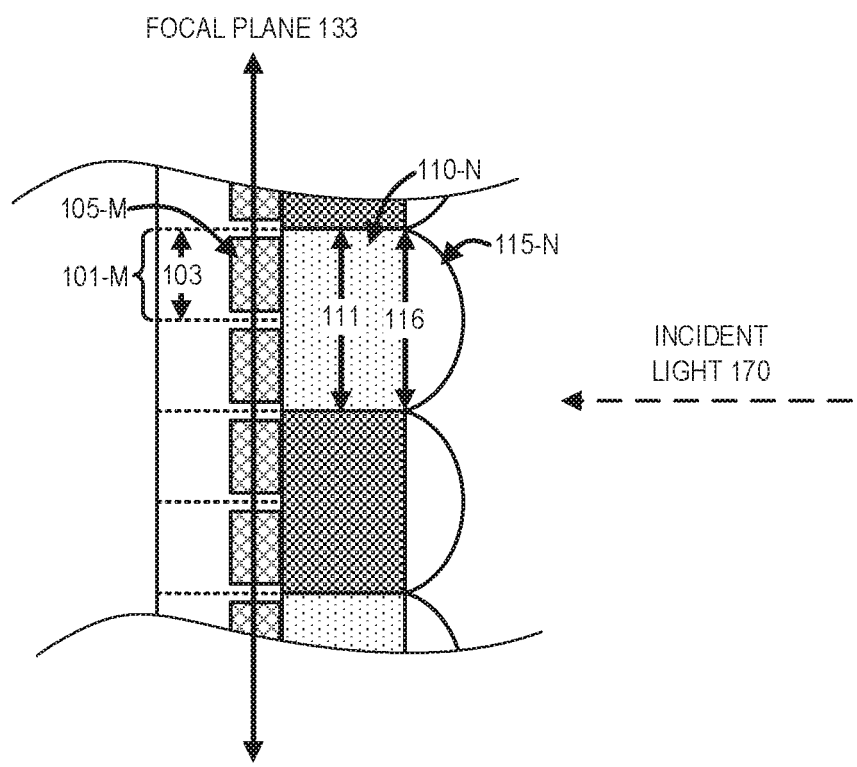
FIG. 1C illustrates a cross-sectional view of an image sensor relative to a focal plane of the image sensor, in accordance with the teachings of the present disclosure.

FIG. 1C illustrates a cross-sectional view 100-C of image sensor 100 relative to a focal plane 133 of the image sensor 100, in accordance with the teachings of the present disclosure. More specifically, the illustrated embodiment demonstrates an exemplary relationship between the first lateral area 103 of respective portions of semiconductor material 101, the second lateral area 111 of the plurality of color filters 110, and the third lateral area 116 of the plurality of microlenses 115 to the focal plane 133 of the image sensor 100. In the illustrated embodiment, the first lateral area, the second lateral area, and the third lateral area are taken along respective cross-sectional planes of the photodiode array (e.g., formed by the plurality of photodiodes 105 within respective portions of semiconductor material 101), the color filter array (e.g., formed by the plurality of color filters 110), and the microlens array (e.g., formed by the plurality of microlenses 115) that are each substantially parallel with the focal plane 133 (i.e., where incident light 170 is focused upon) of image sensor 100. It is appreciated that in some embodiments the first lateral area 103, the second lateral area 111, and the third lateral area 116 are each taken a long a largest cross-section of an optically aligned one of the respective semiconductor portions 101, the plurality of color filters 110, of the plurality of microlenses 115 that is substantially parallel with the focal plane 133 of image sensor 100.

Figure 1D:
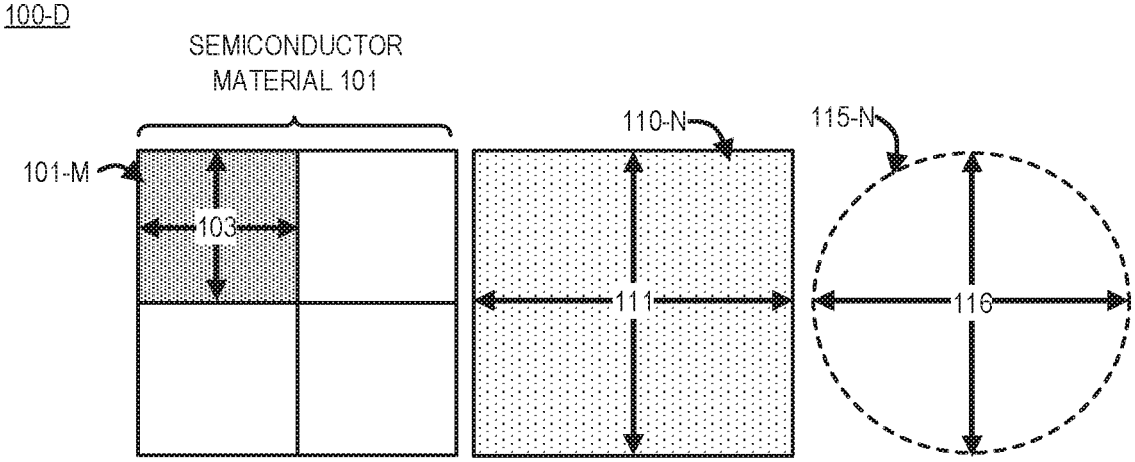
FIG. 1D illustrates a relative size comparison between lateral areas of a respective portion of a semiconductor material, a color filter, and a microlens included in a subpixel of an image sensor, in accordance with the teachings of the present disclosure.

FIG. 1D illustrates an exemplary relative size comparison 100-D between lateral areas of a respective portion 101-M of semiconductor material 101, color filter 110-N, and a microlens 115-N included in a subpixel of image sensor 100, in accordance with the teachings of the present disclosure. In the illustrated embodiment, each of the respective portions (e.g., 101-M) of semiconductor material 101 have a first lateral area 103. Each of the plurality of color filters 110 (e.g., 110-N) have a second lateral area 110 greater than the first lateral area 103. Each of the plurality of microlenses 115 (e.g., 115-N) have a third lateral area 116 greater than the first lateral area 103, but less than the second lateral area 111. In some embodiments, the third lateral area 116 of each of the plurality of microlenses 115 has a circular shape with a diameter extending or otherwise spanning over approximately two of the respective portions of the semiconductor material 101.

Figure 2A:
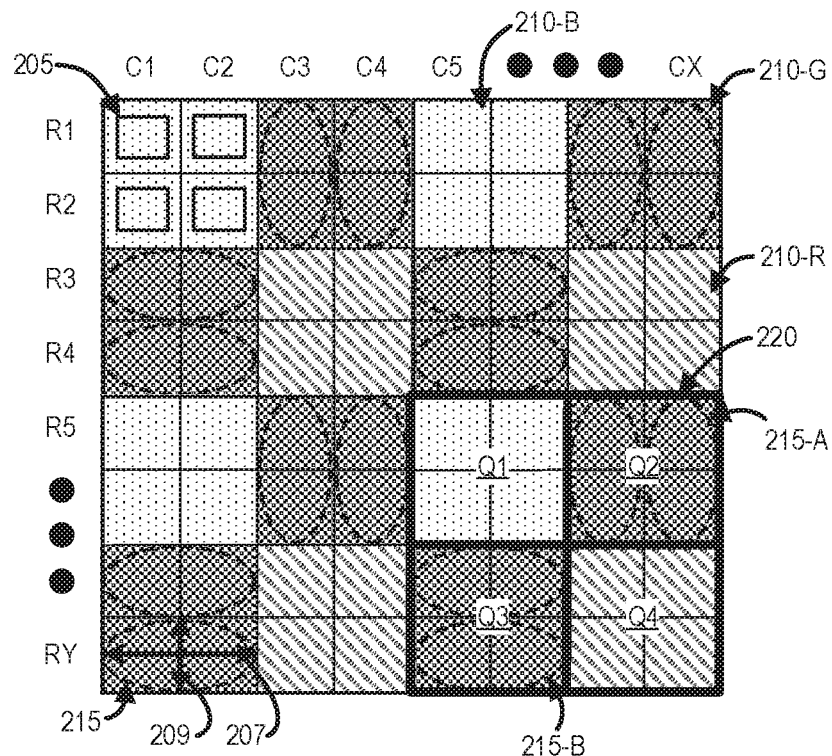
FIG. 2A illustrates a top view of an image sensor with shared microlenses, in accordance with the teachings of the present disclosure.

FIG. 2A illustrates a top view of an image sensor 200 with shared microlenses, in accordance with the teachings of the present disclosure. Image sensor 200 is substantially similar to image sensor 100 illustrated in FIGS. 1A-1D and includes a plurality of photodiodes 205, plurality of color filters 210, and plurality of microlenses 215. One difference between the architecture of image sensor 200 and image sensor 100 is the arrangement and shape of the plurality of microlenses 215 relative to the plurality of microlenses 115.

Referring back to FIG. 2A, image sensor 200 includes a plurality of tiled minimal repeating units (e.g., repeat unit 220) corresponding to groups of four abutting color filters included in the plurality of color filters 210. Repeat unit 220 may be described by four quadrants (e.g., Q1, Q2, Q3, and Q4) with each quadrant including a respective color filter (e.g., blue, green, green, or red color filter) included in the plurality of color filters 210. Each of the quadrants includes groups of four adjacent photodiodes (e.g., arranged in a 2-by-2 array as illustrated in the top left corner of image sensor 200). The plurality of microlenses 215 form a microlens array that includes a plurality of tiled minimal repeating microlens units, each including a first pair of microlenses 215-A and a second pair of microlenses 215-B respectively disposed across the second color filter (e.g., within Q2 of repeat unit 220) and the third color filter (e.g., within Q3 of repeat unit 220) of the tiled minimal repeating unit of the color filter array. As illustrated, the first pair of microlenses 215-A is oriented longitudinally orthogonal to the second pair of microlenses 215-B. Individually, the microlenses included in the plurality of tiled minimal repeating microlens units are optically aligned over two adjacent photodiodes included in the individual groups of four adjacent photodiodes with a length 207 extending over at least two adjacent photodiodes and a width 209 extending over approximately one of the photodiodes included in the plurality of photodiodes 205.

It is appreciated that in the illustrated embodiment, Q2 and Q3 (e.g., the quadrants containing green color filters) each include two microlenses that extend over two columns and one row (or two rows and one column), but in other embodiments similarly shaped microlenses may also be disposed within the other quadrants (e.g., Q1 and Q4 of repeat unit 220). Further still, it is appreciated that in some embodiments, Q1 and Q4 may each include no microlenses, a plurality of microlenses (e.g., a 2-by-2 array of four microlenses centered within an individual quadrant of repeat unit 220), a single microlens (e.g., a microlens extending over two columns and two rows similar to the plurality of microlenses 110 illustrated in FIGS. 1A-1C), or a combination thereof.

Figure 2B:
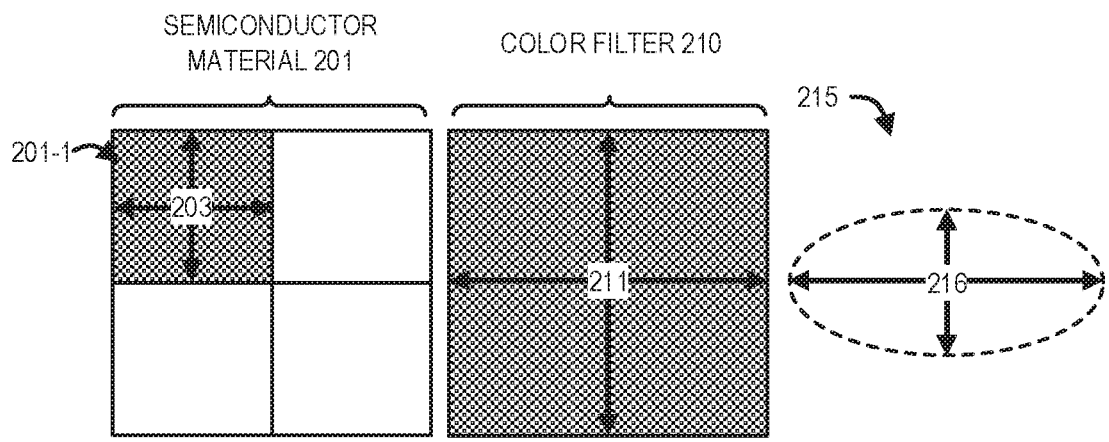
FIG. 2B illustrates a relative size comparison between lateral areas of semiconductor material, a color filter, and a microlens included in a subpixel of an image sensor, in accordance with the teachings of the present disclosure.

FIG. 2B illustrates a relative size comparison between lateral areas of semiconductor material 201, a color filter 210, and a microlens 215 included in a subpixel (e.g., Q3 of repeat unit 220 illustrated in FIG. 2A) of image sensor 200, in accordance with the teachings of the present disclosure. As illustrated, each respective portion 201 (e.g., 201-1) of semiconductor material 201 has a first lateral area and the color filter 210 has a second lateral area 211 greater than the first lateral area. The microlens 215 has a third lateral area 216 that has an ovoidal shape with a length extending approximately over two of the respective portions of semiconductor material 201 and a width extending approximately one of the respective portions of semiconductor material 201. Thus, the third lateral area 216 is larger than the first lateral area 203, but less than the second lateral area 211.

Figure 3:
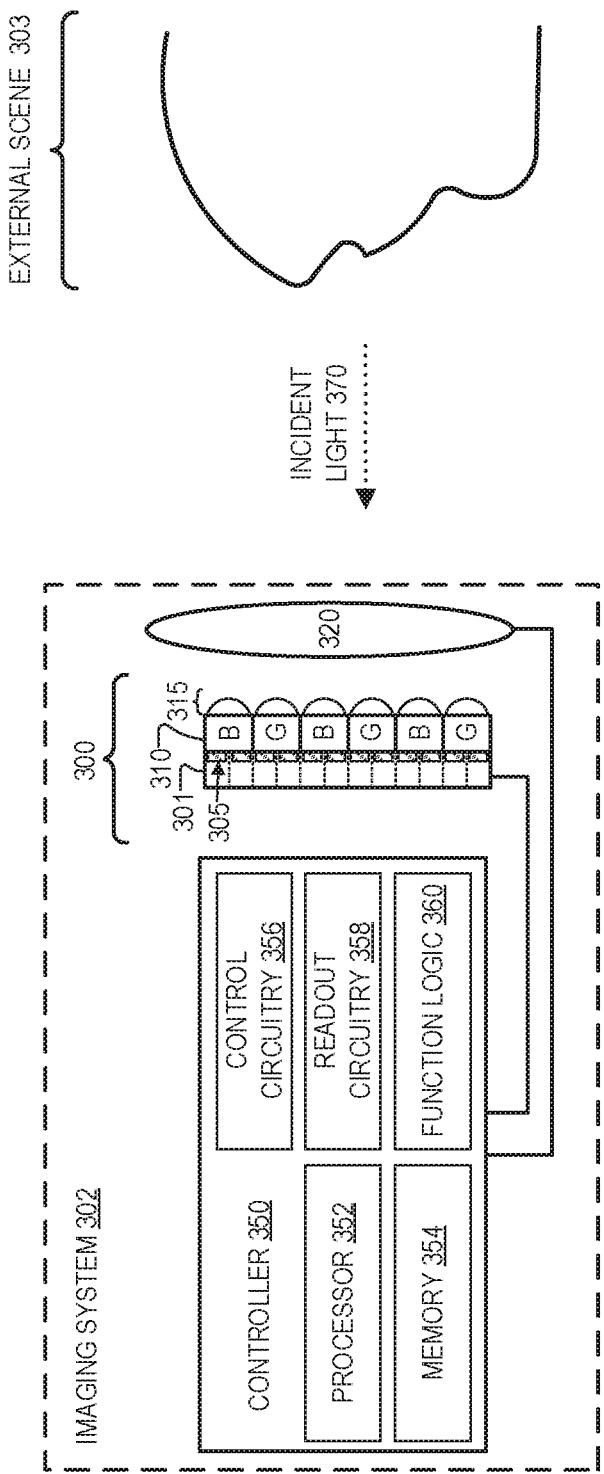
FIG. 3 is a functional block diagram of an imaging system including an image sensor with shared microlenses, in accordance with the teachings of the present disclosure.

FIG. 3 is a functional block diagram of an imaging system 302 including an image sensor 300 with shared microlenses, in accordance with the teachings of the present disclosure. Imaging system 302 is capable of focusing on a point of interest (POI) within an external scene 303 in response to incident light 370. Imaging system 302 includes image sensor 300 to generate electrical or image signals in response to incident light 370, objective lens(es) 320 with adjustable optical power to focus on one or more points of interest within the external scene 303, and controller 350 to control, inter alia, operation of image sensor 300 and objective lens(es) 320. Image sensor 300 is one possible implementation of image sensor 100 or 200 illustrated in FIGS. 1A-2B and includes a semiconductor material 301 with a plurality of photodiodes 305 disposed within respective portions of the semiconductor material 301, a plurality of color filters 310, and a plurality of microlenses 315. The controller 350 includes one or more processors 352, memory 354, control circuitry 356, readout circuitry 358, and function logic 360.

The controller 350 includes logic and/or circuitry to control the operation (e.g., during pre-, post-, and in situ phases of image and/or video acquisition) of the various components of imaging system 302. The controller 350 may be implemented as hardware logic (e.g., application specific integrated circuits, field programmable gate arrays, system-on-chip, etc.), software/firmware logic executed on a general purpose microcontroller or microprocessor, or a combination of both hardware and software/firmware logic. In one embodiment, the controller 350 includes the processor 352 coupled to memory 354 that store instructions for execution by the controller 350 or otherwise by one or more components of the imaging system 302. The instructions, when executed by the controller 350, may cause the imaging system 302 to perform operations that may associated with the various functional modules, logic blocks, or circuitry of the imaging system 302 including any one of, or a combination of, the control circuitry 356, the readout circuitry 358, the function logic 360, image sensor 300, objective lens 320, and any other element of imaging system 302 (illustrated or otherwise). The memory is a non-transitory computer-readable medium that may include, without limitation, a volatile (e.g., RAM) or non-volatile (e.g., ROM) storage system readable by controller 350. It is further appreciated that the controller 350 may be a monolithic integrated circuit, one or more discrete interconnected electrical components, or a combination thereof. Additionally, in some embodiments the one or more electrical components may be coupled to one another to collectively function as the controller 350 for orchestrating operation of the imaging system 302.

Control circuitry 356 may control operational characteristics of the image pixel array 305 (e.g., exposure duration, when to capture digital images or videos, and the like). Readout circuitry 358 reads or otherwise samples the analog signal from the individual photodiodes (e.g., read out electrical signals generated by each of the plurality of photodiodes 305 in response to incident light to generate a phase detection auto focus signal, read out image signals to capture an image frame, and the like) and may include amplification circuitry, analog-to-digital (ADC) circuitry, image buffers, or otherwise. In the illustrated embodiment, readout circuitry 358 is included in controller 350, but in other embodiments readout circuitry 358 may be separate from the controller 350. Function logic 360 is coupled to the readout circuitry 358 to receive the electrical signals to generate a phase-detection auto focus (PDAF) signal in response, generate an image in response to receiving image signals or data, and the like. In some embodiments, the electrical or image signals may be respectively stored as a PDAF signal or image data and may be manipulated by the function logic 330 (e.g., demosaic the image data, apply post image effects such as crop, rotate, remove red eye, adjust brightness, adjust contrast, or otherwise).

Figure 4:
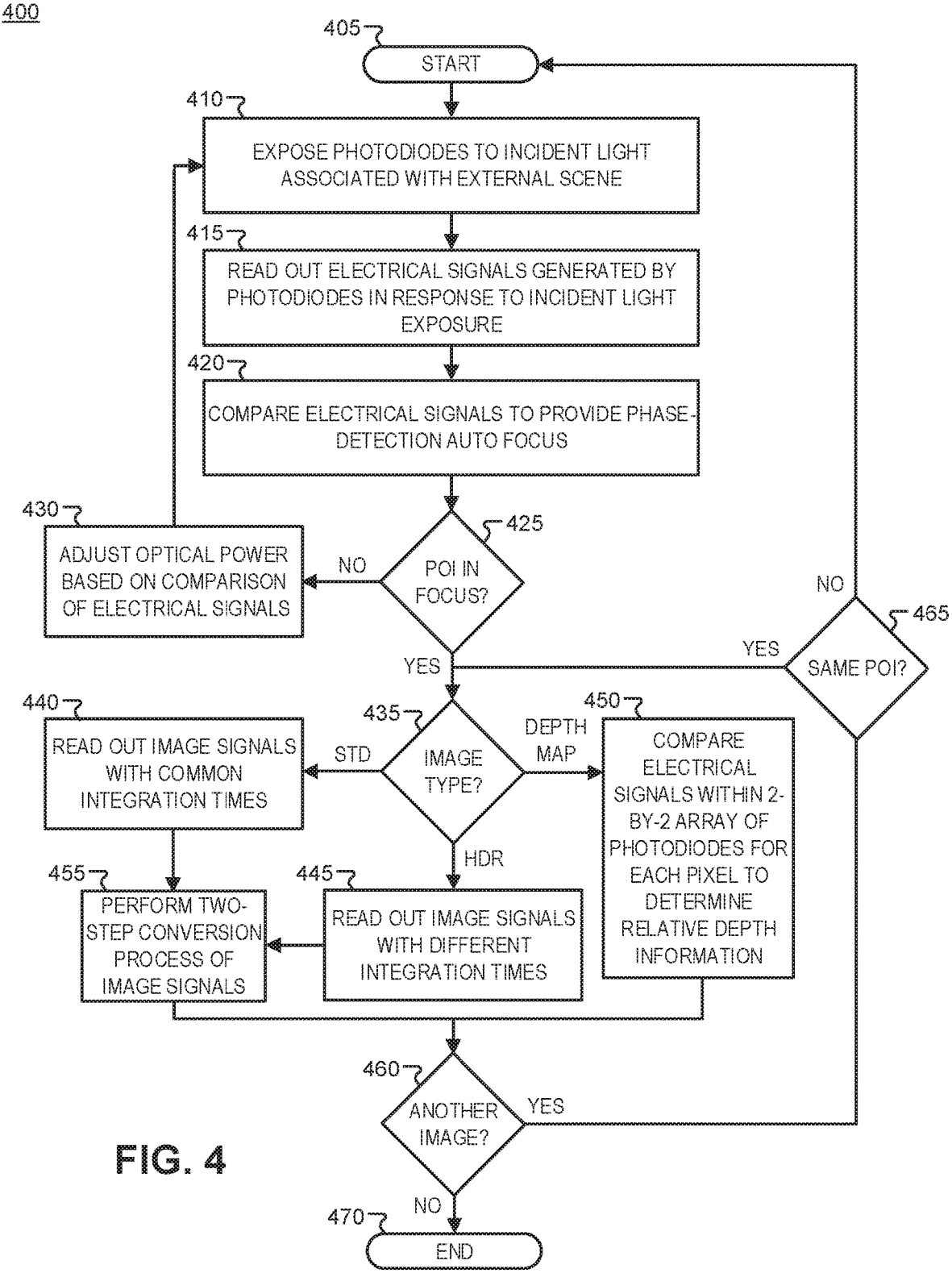
FIG. 4 shows an example method for capturing an image with an imaging system including an image sensor with shared microlenses, in accordance with the teachings of the present disclosure.

FIG. 4 shows an example process or method 400 for capturing an image with an imaging system including an image sensor with shared microlenses, in accordance with the teachings of the present disclosure. In some embodiments method 400 may be implemented by imaging system 302 illustrated in FIG. 3 and/or any of image sensor 100 illustrated in FIGS. 1A-1D, image sensor 200 illustrated in FIG. 2A-2B, or image sensor 300 illustrated in FIG. 3. It is appreciated that the numbered blocks of method 400, including blocks 405-470, may occur in any order and even in parallel. Additionally, blocks may be added to, or removed from, method 400 in accordance with the teachings of the present disclosure.

Block 405 illustrates initialization of method 400 upon receipt of a signal (e.g., a depressed shutter button of the imaging system) to capture an image frame representative of an external scene. During initialization, a point of interest (POI) of the external scene to be imaged by the image sensor may be provided (e.g., selected by a user of the imaging system), automatically detected (e.g., during a subsequent step with a phase detection auto-focus signal), or otherwise obtained. The POI may represent one or more regions of the external scene that are desired to be in focus.

Block 410-430 show steps for generating a phase detection auto focus (PDAF) signal using an image sensor with shared microlens and, if necessary, adjusting optical power of an objective lens to configure the imaging system to focus on one or more points of interest as illustrated in various embodiments of the disclosure. More specifically, the utilized image sensor (e.g., image sensor 100, 200, or 300 illustrated respectively in FIGS. 1A-1D, FIGS. 2A-2B, and FIG. 3) include groups of four photodiodes arranged in a 2-by-2 array sharing (i.e., optically aligned with) a common microlens and color filter such that each subpixel within the image pixel array of the image sensor may be configured as a phase detector.

Block 410 illustrates exposing the plurality of photodiodes to incident light associated with an external scene. In response to the incident light the plurality of photodiodes generate electrical signals proportional to the intensity of the incident light.

Block 415 shows reading out electrical signals (e.g., via readout circuitry 356 illustrated in FIG. 3) in response to the incident light. Electrical signals may be read out individually from respective subpixels (e.g., by transferring the image charge generated in each of the photodiodes as an electrical signal one row at a time to column storage capacitors, and then reading out the elements individually using a column decoder coupled to a multiplexer) in response to the incident light such that each of the electrical signals generated by a corresponding photodiode included in a group of four photodiodes sharing a common color filer and microlens may be grouped together.

Block 420 illustrates comparing the electrical signals to provide phase-detection auto focus for the imaging system. Function logic (e.g., as illustrated in FIG. 3) may be utilized to generate the PDAF signal based, at least in part, on a comparison between the electrical signals associated with at least a group of four photodiodes included in the plurality of photodiodes. In one embodiment, the electrical signals that are grouped together due to sharing a common color filter and common microlens may be compared to one another to operate as a phase detector. In one embodiment, the function logic generates the PDAF signal by comparing the electrical signals between adjacent photodiodes included in the group of four photodiodes and further comparing the electrical signals between diagonal photodiodes included in the group of four photodiodes.

Block 425 shows determining whether the point of interest is in focus based, at least in part, on the comparison between the electrical signals. In one embodiment, one or more phase images are generated based on the electrical signals. For example, if a shared microlens is optically aligned with four photodiodes, the electrical signal from each respective quadrant may be utilized to generate respective phase images (i.e., four phase images). Each of the phase images may be compared (i.e., groups of the electrical signals associated with a common microlens of a respective one of the 2-by-2 array of photodiodes) are compared to generate a PDAF signal that provides multi-directional information as to whether the point of interest is in focus.

Block 425 proceeds to block 430 if the point of interest is not in focus and adjusts optical power (e.g., provided by an objective lens) based on the comparison of the electrical signals. In other words, the comparison allows for determining if the optical power of the objective lens results in the external scene being in focus, front focused, or back focused and provides instructions to adjust the optical power accordingly. Once the optical power of the objective lens is adjusted, block 430 proceeds to block 410 to start the process again of determining whether the point of interest is in focus.

If the point of interest is in focus, block 425 proceeds to block 435 to configure the imaging system to capture an image based on a pre-determined or otherwise selected image type, or combination thereof. Block 435 respectively proceeds to block 440, 445, or 450 depending on whether the image type is a standard image (STD), a high-dynamic range image (HDR), or a depth map image.

Block 440 illustrates reading out image signals (e.g., exposing the image sensor to incident light for capturing an image) with common integration times. In other words, the readout duration for each of the photodiodes may be similar and subsequently used to generate an image.

Block 445 shows reading out image signals with different integration times to capture a high-dynamic range image. In particular, the electrical signals are readout with different integration times within the 2-by-2 array of photodiodes for each subpixel included in the pixel array to provide HDR imaging. In particular, two photodiodes within the group of four photodiodes may be read out with a first integration time while the other two photodiodes included in the group of photodiodes may be read out with a second integration time that is longer than the first integration time. The different integration times allows for greater dynamic range of the image sensor and collectively the electrical signals of a given group of four photodiodes may be used to generate image signals or image data for generating the HDR image.

Block 450 illustrates comparing the electrical signals associated with different photodiodes within the 2-by-2 array of photodiodes for each (sub)pixel to determine a relative depth information for generating a depth map of the external scene.

Once the image signals are read out for capturing either a standard image (i.e., block 440) or an HDR image (i.e., block 445), method 400 proceeds to block 455 to perform a two-step conversion process of the image signals. The two-step conversion process of the electrical signals generates image pixel values coded to a color filter pattern different than the color filter array of the imaging system and is based, at least in part, on the architecture of the image sensor included in the imaging system. The two-step conversion process includes at least a first step and a second step. The first step converts the electrical signals to first converted image values color coded to a quad Bayer color filter pattern without shared microlenses (e.g., color filter with repeat units of BGGR with each color filter aligned with four photodiodes). The second step converts the first converted image values to second converted image values color coded to a Bayer color filter pattern.

Block 460 show determining whether another image should be taken. If a signal, setting, or other configuration parameter indicates another image should be taken (e.g., a shutter button of the imaging system being depressed continuously), block 460 proceeds to block 465 to determine whether the same point of interest is selected or otherwise determined. If the same point of interest is selected, block 465 proceeds to block 435 for capturing an image based on the image type. However, if the same point of interest is not selected or it is desired to ensure focus of the point of interest then block 465 proceeds to block 405. If another image is not desired, block 460 proceeds to block 470 to end the image acquisition process.

Figure 5A:
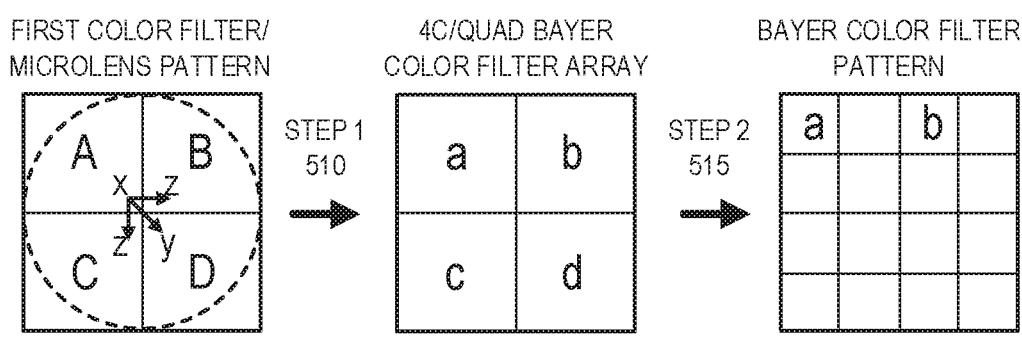
FIG. 5A illustrates an example conversion process for demosaicing image signals obtained from an image sensor with shared microlenses extending over a 2-by-2 array of photodiodes, in accordance with the teachings of the present disclosure.

FIG. 5A illustrates an example conversion process 500 for demosaicing image signals obtained from an image sensor with shared microlenses extending over a 2-by-2 array of photodiodes, in accordance with the teachings of the present disclosure. Process 500 may be implemented with an imaging system (e.g., imaging system 302 illustrated in FIG. 3), an image sensor (e.g., image sensor 100 illustrated in FIGS. 1A-1D), processing device (e.g., a computer or controller separate from the imaging system), any other embodiment of the disclosure, or a combination thereof.

Process 500 is a two-step conversion process including step 1 510 and step two 515 to convert electrical signals to a color filter pattern different than the color filter array of the imaging system. During step 1 510 electrical signals generated in response to incident light are used to generate image pixel values coded to a quad Bayer color filter pattern without shared microlenses. Each photodiode within a group of four photodiodes may generate a corresponding electrical signal (A, B, C, and D), which may be coded (i.e., demosaiced) to the quad Bayer color filter array as first converted image signals (a, b, c, and d) with a condition of "x+y+z+z=1" and a pre-determined conversion rule as follows:

$$\begin{pmatrix} a \\ b \\ c \\ d \end{pmatrix} = \begin{pmatrix} x & z & z & y \\ z & x & y & z \\ z & y & x & z \\ y & z & z & x \end{pmatrix} \begin{pmatrix} A \\ B \\ C \\ D \end{pmatrix}. \tag{1}$$

Equation (1) includes a plurality of functions, x, y, and z which are based on the wavelength of light associated with the particular electrical signal (e.g., the spectral photoresponse of the corresponding color filter) and the chief ray angle that is determined by the shape and position of the particular microlens within the image pixel array. Step 2 515 then converts the first converted image values to second converted image values coded to a Bayer color filter pattern (e.g., a minimal repeat unit of the color filter array is "BGGR" and each color filter is associated with a single photodiode).

Figure 5B:
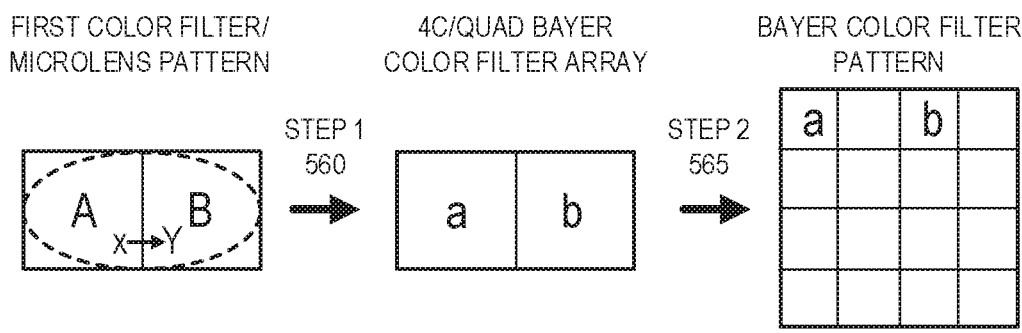
FIG. 5B illustrates an example conversion process for demosaicing image signals obtained from an image sensor with shared microlenses extending over a 2-by-1 array of photodiodes, in accordance with the teachings of the present disclosure.

FIG. 5B illustrates an example conversion process 550 for demosaicing image signals obtained from an image sensor with shared microlenses extending over a 2-by-1 array of photodiodes, in accordance with the teachings of the present disclosure. Process 550 may be implemented with an imaging system (e.g., imaging system 302 illustrated in FIG. 3), an image sensor (e.g., image sensor 200 FIGS. 2A-2B), processing device (e.g., a computer or controller separate from the imaging system), any other embodiment of the disclosure, or a combination thereof.

Process 550 is a two-step conversion process including step 1 560 and step two 565 to convert electrical signals to a color filter pattern different than the color filter array of the imaging system. During step 1 560 electrical signals generated in response to incident light are used to generate image pixel values coded to a quad Bayer color filter pattern without shared microlenses. Each photodiode within a group of two photodiodes may generate a corresponding electrical signal (A and B), which may be coded (i.e., demosaiced) to the quad Bayer color filter array as first converted image signals (a and b) with a condition of "x+y=1" and a pre-determined conversion rule as follows:

$$\begin{pmatrix} a \\ b \end{pmatrix} = \begin{pmatrix} x & y \\ y & x \end{pmatrix} \begin{pmatrix} A \\ B \end{pmatrix}. \tag{2}$$

Equation (2) includes a plurality of functions, x and y, which are based on the wavelength of light associated with the particular electrical signal (e.g., the spectral photoresponse of the corresponding color filter) and the chief ray angle that is determined by the shape and position of the particular microlens within the image pixel array. Step 2 560 then converts the first converted image values to second converted image values coded to a Bayer color filter pattern (e.g., a minimal repeat unit of the color filter is "BGGR" and each color filter is associated with a single photodiode) to generate image pixel values coded to a color filter pattern different than color filter array of the imaging system.

The processes explained above may be implemented using software and/or hardware. The techniques described may constitute machine-executable instructions embodied within a tangible or non-transitory machine (e.g., computer) readable storage medium, that when executed by a machine (e.g., controller 120 of FIG. 1A) will cause the machine to perform the operations described. Additionally, the processes may be embodied within hardware, such as an application specific integrated circuit ("ASIC"), field programmable gate array (FPGA), or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An image sensor, comprising
    a plurality of photodiodes arranged as a photodiode array, each of the plurality of photodiodes disposed within respective portions of a semiconductor material, and wherein each of the respective portions have a first lateral area;
    a plurality of color filters arranged as a color filter array optically aligned with the photodiode array, each of the plurality of color filters having a second lateral area greater than the first lateral area, wherein the color filter array includes a plurality of tiled minimal repeating units corresponding to groups of four abutting color filters included in the plurality of color filters, wherein the groups of four abutting color filters include a first color filter with a first spectral photoresponse, a second color filter with a second spectral photoresponse, and a third color filter with a third spectral photoresponse; and
    a plurality of microlenses arranged as a microlens array optically aligned with the color filter array and the photodiode array, each of the plurality of microlenses having a third lateral area greater than the first lateral area and less than the second lateral area, wherein the third lateral area has an ovoidal shape with a length extending approximately two of the respective portions of the semiconductor material and a width extending approximately one of the respective portions of the semiconductor material, and
    wherein the microlens array includes a plurality of tiled minimal repeating microlens units, each including a first pair of microlenses and a second pair of microlenses respectively disposed across the second color filter and the third color filter of the tiled minimal repeating unit of the color filter array, and wherein the first pair of microlenses is oriented longitudinally orthogonal to the second pair of microlenses.

2. The image sensor of claim 1, wherein the first lateral area, the second lateral area, and the third lateral area are taken along respective cross-sectional planes of the photodiode array, the color filter array, and the microlens array that are each substantially parallel with a focal plane of the image sensor.

3. The image sensor of claim 1, wherein each of the plurality of color filters extend across individual groups of four adjacent photodiodes included in the photodiode array that are arranged in a 2-by-2 pattern.

4. The image sensor of claim 3, wherein each of the groups of four abutting color filters further include a fourth color filter with a fourth spectral photoresponse, wherein the second spectral photoresponse is substantially identical to the third spectral photoresponse, wherein the first spectral photoresponse and the fourth spectral photoresponse are different from each other, the second spectral photoresponse, and the third spectral photoresponse, and wherein the second color filter and the third color filter are diagonally opposite one another within an individual one of the plurality of tiled minimal repeating units.

5. The image sensor of claim 4, wherein at least one of the plurality of microlenses is substantially centered over a respective one of the individual groups of four adjacent photodiodes and a respective one of the plurality of color filters, and wherein a corresponding lateral area of the at least one of the plurality of microlenses has a circular shape with a diameter extending over approximately two of the respective portions of the semiconductor material.

6. The image sensor of claim 5, wherein the at least one of the plurality of microlenses is symmetric.

7. The image sensor of claim 4, wherein each of the plurality of microlenses is optically aligned over two adjacent photodiodes included in the individual groups of four adjacent photodiodes.

8. The image sensor of claim 1, further comprising:
    readout circuitry coupled to the image sensor to read out electrical signals generated by each of the plurality of photodiodes in response to incident light; and
    function logic coupled to the readout circuitry to receive the electrical signals and generate a phase-detection auto focus (PDAF) signal in response to receiving the electrical signals, and wherein the PDAF signal is based, at least in part, on a comparison provided by the function logic between the electrical signals associated with at least a group of four photodiodes included in the plurality of photodiodes, and wherein the group of four photodiodes share a common microlens included in the plurality of microlenses and a common color filter included in the plurality of color filters.

9. The image sensor of claim 8, wherein the function logic generates the PDAF signal by comparing the electrical signals between adjacent photodiodes included in the group of four photodiodes and further comparing the electrical signals between diagonal photodiodes included in the group of four photodiodes.

10. An imaging system, comprising:
    an image sensor including a plurality of subpixels arranged in an image pixel array, wherein each of the plurality of subpixels include a 2-by-2 array of photodiodes disposed in respective portions of a semiconductor material, a color filter optically aligned with the 2-by-2 array of photodiodes, and a microlens optically centered over the 2-by-2 array of photodiodes and the color filter, and wherein the color filter in each of the plurality of pixels collectively form a color filter array with a minimal repeat unit spanning across a 2-by-2 array of subpixels included in the plurality of subpixels; and
    a controller coupled to the image sensor and logic that when executed by the controller causes the imaging system to perform operations including:
        reading out electrical signals in response to incident light with different integration times for different photodiodes within the 2-by-2 array of photodiodes for each subpixel included in the pixel array to provide high-dynamic range imaging, and wherein each of the electrical signals is generated by a corresponding photodiode included in the 2-by-2 array of photodiodes for one or more subpixels included in the plurality of subpixels.

11. The imaging system of claim 10, further comprising additional logic that when executed by the controller causes the imaging system to perform further operations including:

comparing the electrical signals to provide phase-detection auto focus (PDAF) for the imaging system.

12. The imaging system of claim 11, wherein groups of the electrical signals associated with the microlens of a respective one of the 2-by-2 array of photodiodes are compared to provide the PDAF.

13. The imaging system of claim 10, wherein the minimal repeat unit of the color filter array includes groups of four abutting color filters, wherein each of the groups of four abutting color filters include a first color filter with a first spectral photoresponse, a second color filter with a second spectral photoresponse, a third color filter with a third spectral photoresponse, and a fourth color filter with a fourth spectral photoresponse, wherein the second spectral photoresponse is substantially identical to the third spectral photoresponse, and wherein the second color filter is disposed diagonally across from the third color filter within the minimal repeat unit of the color filter array.

14. The imaging system of claim 13, further comprising additional logic that when executed by the controller causes the imaging system to perform further operations including:

providing a two-step conversion process of the electrical signals to generate image pixel values coded to a color filter pattern different than the color filter array of the imaging system.

15. The imaging system of claim 14, wherein the two-step conversion process includes at least a first step and a second step, wherein the first step converts the electrical signals to first converted image values color coded to a quad Bayer color filter pattern without shared microlenses, and wherein the second step converts the first converted image values to second converted image values color coded to a Bayer color filter pattern.

16. The imaging system of claim 10, further comprising additional logic that when executed by the controller causes the imaging system to perform further operations including:

generating depth information by comparing the electrical signals associated with different photodiodes within the 2-by-2 array of photodiodes for each of the plurality of sub pixels.

* * * * *